United States Patent
Yamatani et al.

(10) Patent No.: US 10,975,501 B2
(45) Date of Patent: Apr. 13, 2021

(54) CARBON MATERIAL AND PRODUCTION METHOD FOR SAME

(71) Applicant: Mitsubishi Chemical Corporation, Tokyo (JP)

(72) Inventors: Manabu Yamatani, Tokyo (JP); Tomoyuki Kotani, Tokyo (JP); Tomoyoshi Yamashita, Tokyo (JP); Kazunao Hareyama, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 478 days.

(21) Appl. No.: 15/743,793

(22) PCT Filed: Jul. 14, 2016

(86) PCT No.: PCT/JP2016/070844
§ 371 (c)(1),
(2) Date: Jan. 11, 2018

(87) PCT Pub. No.: WO2017/010546
PCT Pub. Date: Jan. 19, 2017

(65) Prior Publication Data
US 2018/0202079 A1    Jul. 19, 2018

(30) Foreign Application Priority Data

Jul. 14, 2015 (JP) .............................. JP2015-140278

(51) Int. Cl.
*D01F 9/22* (2006.01)
*C01B 32/05* (2017.01)
*D01F 9/127* (2006.01)
*D01F 9/32* (2006.01)
*D01F 9/21* (2006.01)

(52) U.S. Cl.
CPC ................ *D01F 9/22* (2013.01); *C01B 32/05* (2017.08); *D01F 9/1275* (2013.01); *D01F 9/328* (2013.01); *D01F 9/21* (2013.01)

(58) Field of Classification Search
CPC .......... D01F 9/22; D01F 9/1275; D01F 9/328; D01F 9/21; D01F 9/12; C01B 32/05
See application file for complete search history.

(56) References Cited

U.S. PATENT DOCUMENTS 4,385,043 A * 5/1983 Cagliostro ............. B82Y 30/00
423/447.2
2009/0220409 A1 9/2009 Curliss et al.

FOREIGN PATENT DOCUMENTS

| | | |
|---|---|---|
| CN | 1461829 A | 12/2003 |
| GB | 2 248 230 A | 4/1992 |
| JP | 2000-203823 A | 7/2000 |
| JP | 2006-170496 A | 6/2006 |
| JP | 2009-256631 A | 11/2009 |
| JP | 2015-71722 A | 4/2015 |
| JP | 2015-74844 A | 4/2015 |
| WO | WO 99/11846 A1 | 3/1999 |
| WO | 2014/011460 A1 | 1/2014 |
| WO | 2014/011462 A1 | 1/2014 |

OTHER PUBLICATIONS

Zhang, et al., Structure and Properties Development During the Conversion of Polyethylene Precursors to Carbon Fibers 1996; 62(2): 367-373 (Year: 1996).*
Extended European Search Report dated May 17, 2018 in Patent Application No. 16824526.4.
Office Action dated Dec. 6, 2018 in Korean Patent Application No. 10-2018-7001765 (with unedited computer generated English translation).
International Search Report dated Oct. 18, 2016, in PCT/JP2016/070844, filed Jul. 14, 2016.
Notification of Reasons for Refusal dated Jun. 22, 2017, in Japanese Patent Application Nos. 2016-549525, filed Jul. 14, 2015 (with English translation).
Japanese Office Action dated Sep. 3, 2019 in Patent Application No. 2018-127888 (with unedited computer generated English translation), 4 pages.
Japanese Office Action dated Apr. 28, 2020 in Japanese Patent Application No. 2018-127888 (with unedited computer generated English translation), 6 pages.
Japanese Office Action dated Nov. 4, 2020 in Patent Application No. 2018-127888 (with unedited computer generated English translation), 6 pages.

* cited by examiner

*Primary Examiner* — Daniel C. McCracken

(74) *Attorney, Agent, or Firm* — Oblon, McClelland, Maier & Neustadt, L.L.P.

(57) ABSTRACT

A method for producing a carbon material, the method including a step of performing a carbonization treatment by heating an organic polymer material to a temperature higher than 400° C. in a non-oxidizing atmosphere containing a gaseous substance (A) composed of at least one of acetylene and an acetylene derivative.

18 Claims, 6 Drawing Sheets

CARBON MATERIAL AND PRODUCTION METHOD FOR SAME

TECHNICAL FIELD

The present invention relates to a carbon material and a production method thereof.

Priority is claimed on Japanese Patent Application No. 2015-140278, filed Jul. 14, 2015, the content of which is incorporated herein by reference.

BACKGROUND ART

Since carbon materials, such as carbon fibers, have excellent mechanical strength, they are extremely useful as industrial materials and the like such as automobile members, aerospace materials, materials for sports and leisure, and pressure vessels, and the demand is increasing. Further, they are expected to be used in a wider range of fields in the future.

In general, a carbon fiber is obtained by performing a flame-resistant treatment by heating a precursor fiber formed by bundling precursor filaments composed of polyacrylonitrile or the like in a flame-resistant furnace filled with an oxidizing atmosphere, and then performing a carbonization treatment by heating the obtained flame-resistant fiber in a carbonization furnace filled with an inert atmosphere such as nitrogen (for example, Patent Document 1).

CITATION LIST

Patent Document

[Patent Document 1] Japanese Unexamined Patent Application, First Publication No. 2009-256831

SUMMARY OF INVENTION

Technical Problem

However, in the conventional method for producing a carbon fiber, since the amount of thermal decomposition of the flame-resistant fiber during the carbonization treatment is large and breaking away of carbon atoms also occurs, the carbonization yield is low. Therefore, it is difficult to reduce the production cost of the carbon fiber obtained by carbonizing a flame-resistant fiber.

The present invention has been made in view of the above circumstances, and an object thereof is to provide a method for efficiently producing a carbon material without lowering the carbonization yield, and a carbon material obtained by the above method.

Solution to Problem

The present invention includes the following aspects.

[1] A method for producing a carbon material, including a step of performing a carbonization treatment by heating an organic polymer material to a temperature higher than 400° C. in a non-oxidizing atmosphere containing a gaseous substance (A) including at least one of acetylene and an acetylene derivative.

[2] The method for producing a carbon material according to [1], wherein the organic polymer material includes a vinyl-based polymer.

[3] The method for producing a carbon material according to [2], wherein the vinyl-based polymer includes at least one of an acrylonitrile-based polymer and a derivative of an acrylonitrile-based polymer.

[4] The method for producing a carbon material according to [2], wherein the vinyl-based polymer includes at least one of an olefin-based polymer and a derivative of an olefin-based polymer.

[5] The method for producing a carbon material according to [4], wherein the olefin-based polymer includes at least one of polyethylene and polypropylene.

[6] The method for producing a carbon material according to [1], including a step of subjecting an organic polymer material precursor to an oxidation treatment to obtain the organic polymer material before the carbonization treatment step.

[7] The method for producing a carbon material according to [6], wherein the oxidation treatment is a step of performing an oxidation treatment by heating an organic polymer material precursor to a temperature of 200 to 350° C. in an oxidizing atmosphere.

[8] The method for producing a carbon material according to [6] or [7], wherein the organic polymer material precursor includes a vinyl-based polymer.

[9] The method for producing a carbon material according to [8], wherein the vinyl-based polymer includes at least one of an acrylonitrile-based polymer and a derivative of an acrylonitrile-based polymer.

[10] The method for producing a carbon material according to [8], wherein the vinyl-based polymer includes at least one of an olefin-based polymer and a derivative of an olefin-based polymer.

[11] The method for producing a carbon material according to [10], wherein the olefin-based polymer includes at least one of polyethylene and polypropylene.

[12] The method for producing a carbon material according to any one of [11] to [11], wherein a volume concentration of the gaseous substance (A) is 2% by volume or more with respect to the total volume of the gas forming the non-oxidizing atmosphere.

[13] The method for producing a carbon material according to any one of [1] to [12], wherein the non-oxidizing atmosphere includes a nitrogen gas.

[14] The method for producing a carbon material according to any one of [1] to [13], including a step of further heating the organic polymer material to a temperature of 1,000° C. or higher in a nitrogen atmosphere, after heating the organic polymer material to the temperature exceeding 400° C. in the non-oxidizing atmosphere.

[15] The method for producing a carbon material according to any one of [1] to [14], wherein the organic polymer material is fibrous.

[16] A carbon material obtained by the method for producing a carbon material according to any one of [1] to [15].

Advantageous Effects of Invention

According to the present invention, it is possible to provide a method for efficiently producing a carbon material without lowering the carbonization yield, and a carbon material obtained by the above method.

DESCRIPTION OF EMBODIMENTS

"Production Method of Carbon Material"

Figure 1:
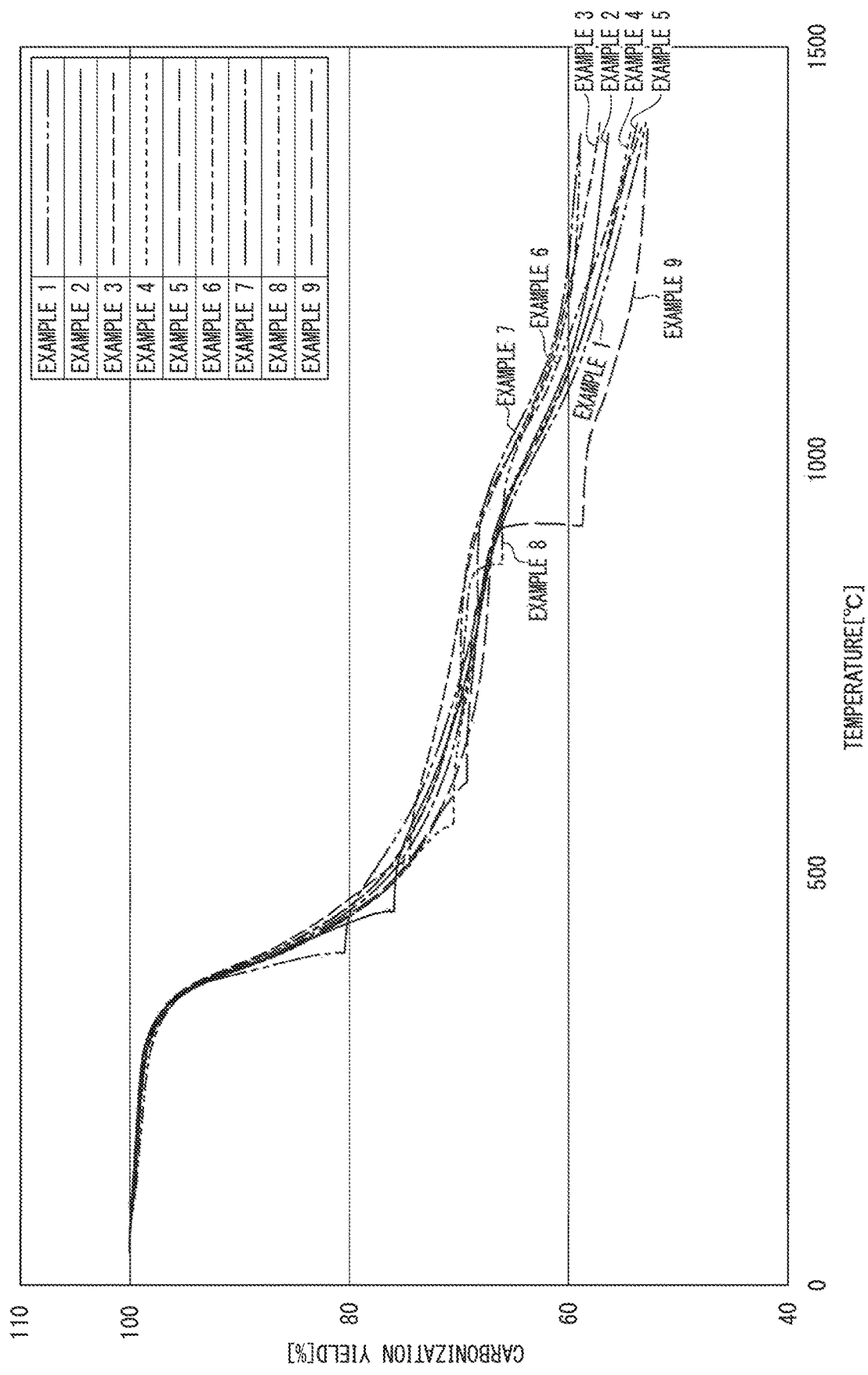
FIG. 1 is a graph obtained by plotting the carbonization yield (vertical axis) against the temperature (horizontal axis) for Examples 1 to 9.

Hereinafter, an embodiment of a method for producing a carbon material according to the present invention will be described.

The method for producing a carbon material of the present embodiment is for obtaining a carbon material by subjecting an organic polymer material to a heat treatment, and includes a carbonization step described below. In addition, the method for producing a carbon material may include an oxidation step described below before the carbonization step.

<Organic Polymer Material>

Examples of the organic polymer material include organic polymer materials such as vinyl-based polymers obtained using vinyl-based monomers as raw materials, lignin and cellulose extracted from wood, or regenerated cellulose such as rayon, and pitch obtained using petroleum, coal or the like as raw materials. Any one of these may be used alone, or two or more of these may be used in combination. Among them, an organic polymer material of a vinyl-based polymer is preferable because it is superior in productivity on an industrial scale and mechanical properties.

As the vinyl-based polymer, a polymer containing at least one of an acrylonitrile-based polymer and a derivative of an acrylonitrile-based polymer (hereinafter also referred to as "polymer A"), a polymer containing at least one of an olefin-based polymer and a derivative of an olefin-based polymer (hereinafter also referred to as "polymer B"), and the like can be mentioned.

The acrylonitrile-based polymer may be a homopolymer of acrylonitrile or a copolymer of acrylonitrile and a vinyl-based monomer copolymerizable with acrylonitrile. The proportion of the acrylonitrile unit is preferably 70% by mass or more, and the proportion of the vinyl-based monomer unit is preferably 30% by mass or less, with respect to the total (100% by mass) of all units constituting the acrylonitrile-based polymer. More preferably, the proportion of the acrylonitrile unit is from 90 to 98% by mass and the proportion of the vinyl-based monomer unit is from 2 to 10% by mass.

The vinyl-based monomer is not particularly limited as long as it is copolymerizable with acrylonitrile, and examples thereof include acrylic acid esters such as methyl acrylate, ethyl acrylate, isopropyl acrylate, n-butyl acrylate, 2-ethylhexyl acrylate, 2-hydroxyethyl acrylate and hydroxypropyl acrylate; methacrylic acid esters such as methyl methacrylate, ethyl methacrylate, isopropyl methacrylate, n-butyl methacrylate, n-hexyl methacrylate, cyclohexyl methacrylate, lauryl methacrylate, 2-hydroxyethyl methacrylate, hydroxypropyl methacrylate and diethylaminoethyl methacrylate; unsaturated monomers such as acrylic acid, methacrylic acid, itaconic acid, acrylamide. N-methylolacrylamide, diacetone acrylamide, styrene, vinyltoluene, vinyl acetate, vinyl chloride, vinylidene chloride, vinyl bromide, vinylidene bromide, vinyl fluoride, vinylidene fluoride and butadiene; and p-sulfophenyl methallyl ether, methallylsulfonic acid, allylsulfonic acid, styrenesulfonic acid, 2-acrylamide-2-methylpropanesulfonic acid, and alkali metal salts thereof. Any one of these may be used alone, or two or more of these may be used in combination.

The acrylonitrile-based polymer itself can be obtained by a known polymerization method such as solution polymerization, suspension polymerization or emulsion polymerization. It is preferable to perform a treatment for removing impurities such as unreacted monomers from the acrylonitrile-based polymer obtained by the polymerization.

Examples of the derivative of an acrylonitrile-based polymer include derivatives of the above-mentioned homopolymers of acrylonitrile, derivatives of copolymers of acrylonitrile and the aforementioned vinyl-based monomers, and the like.

Examples of the derivatives of the homopolymers of acrylonitrile include sulfur-modified polyacrylonitrile and the like.

Examples of the derivatives of the copolymers of acrylonitrile and the vinyl-based monomer include hydrogenated nitrile rubber and the like.

The polymer A may be composed only of at least one of an acrylonitrile-based polymer and a derivative of an acrylonitrile-based polymer or may contain a component other than these (hereinafter also referred to as "other component A").

Examples of the other component A contained in the polymer A include a silicone-based oil agent, a phosphoric acid ester, phosphoric acid, and the like.

The proportion of at least one of the acrylonitrile-based polymer and the derivative of an acrylonitrile-based polymer with respect to the total mass of the polymer A is preferably from 70 to 100% by mass, and the proportion of the other component A is preferably from 0 to 30% by mass.

Examples of the olefin-based polymer include homopolymers of ethylene (polyethylene), homopolymers of propylene (polypropylene), copolymers of ethylene and propylene, copolymers of ethylene, propylene and monomers copolymerizable therewith, or a mixture of these polymers. Among these, in view of production cost, polyethylene, polypropylene, or a mixture of polyethylene and polypropylene is preferable.

As the monomer copolymerizable with ethylene and propylene, for example, vinyl acetate, methyl methacrylate, methyl acrylate and the like can be mentioned. Any one of these may be used alone, or two or more of these may be used in combination.

The olefin-based polymer itself can be obtained by a known polymerization method such as gas phase polymerization, solution polymerization or suspension polymerization. It is preferable to perform a treatment for removing impurities such as by-products from the olefin-based polymer obtained by the polymerization.

Examples of the derivatives of olefin-based polymers include derivatives of polyethylene, derivatives of polypropylene, derivatives of copolymers of ethylene and vinyl acetate, and the like.

Examples of the derivatives of polyethylene include maleic anhydride-modified polyethylene, chlorosulfonated polyethylene and chlorinated polyethylene.

Examples of the derivatives of polypropylene include maleic anhydride-modified polypropylene, chlorosulfonated polypropylene and chlorinated polypropylene.

The polymer B may be composed only of at least one of an olefin-based polymer and a derivative of an olefin-based polymer or may contain a component other than these (hereinafter also referred to as "other component B").

Examples of the other component B contained in the polymer B include various elastomers, various inorganic fillers and the like.

The proportion of at least one of the olefin-based polymer and the derivative of an olefin-based polymer with respect to the total mass of the polymer B is preferably from 70 to 100% by mass, and the proportion of the other component B is preferably from 0 to 30% by mass.

The organic polymer material may contain a component other than the above-mentioned polymer (hereinafter also referred to as "optional component").

Examples of the optional component include other carbon materials such as carbon black, carbon nanotube and fullerene, glass materials such as colloidal silica and glass fibers, and the like.

The proportion of the optional component with respect to the total mass of the organic polymer material is preferably from 0 to 30% by mass.

The mass average molecular weight of the organic polymer material is preferably from 5,000 to 800,000, and more preferably from 10,000 to 400,000. When the mass average molecular weight is within the above range, since the fluidity upon heating is within an appropriate range, the molding process tends to be facilitated.

It should be noted that in the present specification, the "mass average molecular weight" is a value of the molecular weight in terms of polystyrene measured by gel permeation chromatography (GPC).

Further, as the organic polymer material, an organic polymer material which is obtained, using various polymers as an organic polymer material precursor, by oxidizing the organic polymer material precursor can be used.

Examples of the organic polymer material precursor include vinyl-based polymers obtained using vinyl-based monomers as raw materials, lignin and cellulose extracted from wood, or regenerated cellulose such as rayon, and pitch obtained using petroleum, coal or the like as raw materials which have been exemplified earlier in the description of the organic polymer material. Any one of these may be used alone, or two or more of these may be used in combination. Among them, an organic polymer material precursor of a vinyl-based polymer is preferable because it is superior in productivity on an industrial scale and mechanical properties.

As the vinyl-based polymer, the polymer containing at least one of the acrylonitrile-based polymer and the derivative of an acrylonitrile-based polymer exemplified above (polymer A), the polymer containing at least one of the olefin-based polymer and the derivative of an olefin-based polymer (polymer B), and the like can be mentioned.

The shape of the organic polymer material and the shape of the organic polymer material precursor are not particularly limited, but may be fibrous, powdery or film-like.

When a fibrous organic polymer material is used, a fibrous carbon material can be obtained. Hereinafter, the fibrous carbon material is also referred to as "carbon fiber", and the fibrous organic polymer material is also referred to as "fiber composed of organic polymer material" or "precursor fiber". It should be noted that the fibrous organic polymer material precursor is also referred to as "precursor fiber".

The precursor fiber is obtained by spinning a spinning dope containing an organic polymer material precursor or an organic polymer material (hereinafter collectively referred to as "organic polymer material (precursor)"). The precursor fiber can be produced by an appropriate spinning method depending on the type of the organic polymer material (precursor).

When the organic polymer material (precursor) is a pitch made from petroleum, coal or the like as a raw material, the precursor fiber can be obtained by melt spinning.

When the organic polymer material (precursor) is regenerated cellulose such as rayon, the precursor fiber can be obtained by a production method in which viscose rayon is spun from a spinning nozzle into diluted sulfuric acid, or the like.

In the case where the organic polymer material (precursor) is soluble in a solvent, the precursor fiber can be obtained by first dissolving the organic polymer material (precursor) in the solvent and then performing spinning.

Although the solvent used for the spinning dope is not particularly limited, when the organic polymer material (precursor) contains the polymer A, for example, organic solvents such as dimethylacetamide, dimethylsulfoxide and dimethylformamide; an aqueous solution of an inorganic compound such as zinc chloride and sodium thiocyanate, and the like can be mentioned. An organic solvent is preferable from the viewpoints that metals are difficult to be mixed in the fiber to be produced, and the process is simplified.

When the organic polymer material (precursor) contains the polymer B, examples of the solvent include normal hexane, benzene, xylene, toluene and chloroform.

When the organic polymer material (precursor) is lignin, examples of the solvent include acetone, chloroform and 2-butanone.

The concentration of the organic polymer material (precursor) in the spinning dope is preferably 17% by mass or more, and more preferably 19% by mass or more, with respect to the total mass of the spinning dope, depending on the degree of polymerization in the spinning process. The upper limit is preferably 30% by mass or less, and more preferably 25% by mass or less.

A method for spinning the spinning dope is not particularly limited, but a wet spinning method, a dry-wet spinning method, a dry spinning method, or the like can be employed.

Further, the coagulated yarns obtained by a wet spinning method, a dry-wet spinning method, a dry spinning method or the like are subjected to conventionally known processes such as water washing, bath stretching, oil application, dry densification, stretching and the like as necessary to obtain a precursor fiber having a predetermined fineness.

As the oil agent, conventionally known silicone-based oil agents, oil agents composed of a silicon-free organic compound, and the like can be mentioned. However, in addition to these, those capable of preventing adhesion between single fibers in the oxidation step and the carbonization step described later can be suitably used as oil agents.

The precursor fiber to which the oil agent is applied is preferably dried and densified by heating. It is efficient to carry out the drying treatment by bringing it into contact with a roller heated to a temperature of 50 to 200° C.

Further, it is preferable that the dried precursor fiber is subsequently stretched. A method of stretching is not particularly limited, but a dry heat stretching method, a hot plate stretching method, a steam stretching method, or the like can be employed.

The number of single fibers of the precursor fiber is preferably from 200 to 300,000, more preferably from 1,000 to 200,000, and still more preferably from 12,000 to 100,000. When the number of single fibers is within the above range, handling of the precursor fiber in the oxidation step and carbonization step is easy, and handling when forming the obtained carbon fiber into a composite material is also easy.

When the organic polymer material (precursor) is in the form of a powder, a powdery carbon material can be obtained.

When the organic polymer material (precursor) is in the form of a pellet, a carbon material in the form of a pellet can be obtained. The organic polymer material (precursor) in the form of a pellet can be obtained, for example, by producing a polymer containing the organic polymer material (precursor) and then molding this polymer into the form of a pellet by a granulator or the like.

When the organic polymer material (precursor) is in the form of a film, a film-like carbon material can be obtained. The film-like organic polymer material (precursor) can be obtained, for example, by a method in which a powder of an organic polymer material (precursor) is dissolved in a solvent to prepare a casting solution, and the casting solution is applied on a substrate and then dried to remove the solvent, or a method in which the casting solution is extruded with a T-die or the like to coagulate in a coagulation liquid, and then the solvent is subsequently removed by washing with water or the like, followed by drying.

As the solvent, the solvents exemplified above in the description of the spinning dope can be used.

<Oxidation Step>

The oxidation step is a step of oxidizing an organic polymer material precursor to obtain an organic polymer material.

In the oxidation step, it is preferable to perform an oxidation treatment by heating the organic polymer material precursor to a temperature of 200 to 350° C. in an oxidizing atmosphere.

Here, the "oxidizing atmosphere" is an air atmosphere or an atmosphere containing a known oxidizing substance such as oxygen, nitrogen dioxide or the like. Among them, from the economic point of view, an air atmosphere is preferable as the oxidizing atmosphere.

Further, the "oxidation treatment" means "flame-resistant treatment" when the organic polymer material precursor contains an acrylonitrile-based polymer, and it means "infusible treatment" when the organic polymer material precursor is a pitch obtained using petroleum, coal or the like as a raw material.

Hereinafter, a precursor fiber obtained by subjecting a precursor fiber composed of an organic polymer material precursor containing an acrylonitrile-based polymer to a flame-resistant treatment is also referred to as "flame-resistant fiber", and a precursor fiber obtained by subjecting a precursor fiber composed of an organic polymer material precursor containing a pitch obtained using petroleum, coal or the like as a raw material to an infusible treatment is also referred to as "infusibilized fiber".

The temperature of the oxidation treatment in an oxidizing atmosphere is preferably from 200 to 350° C. If the temperature of the oxidation treatment is equal to or higher than 200° C., it is possible to suppress the oxidation reaction rate from slowing down, so that the oxidation treatment can be performed in a short period of time. On the other hand, if the temperature of the oxidation treatment is equal to or lower than 350° C., thermal decomposition of the organic polymer material can be suppressed.

When the precursor fiber contains an acrylonitrile-based polymer, the time required for the oxidation treatment of the precursor fiber is preferably 10 minutes or more, more preferably 15 minutes or more, and still more preferably 20 minutes or more, from the viewpoint of enhancing the productivity and performance of the carbon fiber. If the time required for the oxidation treatment is equal to or more than 10 minutes, the oxidation reaction proceeds sufficiently, and unevenness hardly occurs. Further, fuzz and breakage as a small group of filaments hardly occurs in the carbonization step performed after the oxidation step, and productivity can be maintained favorably. The upper limit of the time required for the oxidation treatment is preferably 80 minutes, and more preferably 60 minutes. If the time required for the oxidation treatment is equal to or less than 80 minutes, carbon fibers having sufficient strength are easily obtained.

A method of oxidation treatment it not particularly limited, and a conventionally known method using a hot air circulating furnace (for example, a flame-resistant treatment furnace) or a method of contacting a heated solid surface can be adopted.

In the method using a hot air circulating furnace, a method in which the precursor fiber introduced into the hot air circulating furnace is temporally brought out to the outside of the hot air circulating furnace and subsequently turned back with a turning roller disposed outside the hot air circulating furnace to be repeatedly passed through the hot air circulating furnace is usually adopted.

In the method of contacting a heated solid surface, a method of intermittently bringing the precursor fiber into contact with the heated solid surface is adopted.

In the case where the precursor fiber contains an acrylonitrile-based polymer, in the oxidation step, heating is preferably carried out until the density ($\rho$) of the fiber after the oxidation treatment reaches 1.25 to 1.45 g/cm$^3$, more preferably 1.28 to 1.40 g/cm$^3$. If the density ($\rho$) of the fiber after the oxidation treatment is within the above range, since the residual amount of the carbon fiber in the carbonization step described later increases, it is also advantageous from the economic aspect.

It should be noted that the density ($\rho$) of the fiber is a value measured by a density gradient tube method.

<Carbonization Step>

The carbonization step is a step of performing a carbonization treatment by heating the organic polymer material to a temperature exceeding 400° C. in a non-oxidizing atmosphere containing a gaseous substance (A) composed of at least one of acetylene and an acetylene derivative.

In addition, from the viewpoint of further improving the heat resistance and mechanical properties of the obtained carbon material, in the carbonization step, after heating the organic polymer material to a temperature exceeding 400° C. in the non-oxidizing atmosphere, a step of further heating it to a temperature of 1,000° C. or higher in a nitrogen atmosphere may be included.

It should be noted that in the case where the above-described oxidation step is carried out before the carbonization step, the organic polymer material precursor after the oxidation treatment (for example, flame-resistant fibers, infusibilized fibers, or the like) is subjected to a carbonization treatment.

Hereinafter, a step of heating the organic polymer material to a temperature exceeding 400° C. in a non-oxidizing atmosphere is also referred to as a "first carbonization step", and a step of heating it to a temperature of 1,000° C. or higher in a nitrogen atmosphere after this first carbonization step is also referred to as a "second carbonization step".

(First Carbonization Step)

The first carbonization step is carried out in a non-oxidizing atmosphere containing a gaseous substance (A).

The gaseous substance (A) is composed of at least one of acetylene and an acetylene derivative.

The acetylene derivative is not particularly limited as long as it is a substance which contains a triple bond between a carbon atom and another carbon atom in a molecule and is a gas at a temperature at which the carbonization step is carried out, and examples thereof include ethylacetylene, tert-butylacetylene and the like.

The gaseous substance (A) may be a single gas of acetylene, a single gas of an acetylene derivative, or a mixed gas of acetylene and an acetylene derivative. In the case of a mixed gas of acetylene and an acetylene derivative, the proportion of acetylene is preferably from 50 to 99 mol %, and the proportion of the acetylene derivative is from 1 to 50 mol %, with respect to the total (100 mol %) of all molecules constituting the mixed gas.

From the viewpoint of economy, it is preferable that the gaseous substance (A) is acetylene gas.

Here, the "non-oxidizing atmosphere" is an atmosphere substantially containing no known oxidizing substance such as oxygen, nitrogen dioxide and the like. The term "substantially" means that the volume concentration of the oxidizing substance is 1.0% by volume or less with respect to the total volume of the gas forming the non-oxidizing atmosphere.

As a component other than the gaseous substance (A) contained in the non-oxidizing atmosphere, a gas having no oxidizing property (hereinafter also referred to as "non-oxidizing gas") such as nitrogen, argon and helium can be mentioned. Among these, from the economic viewpoint, nitrogen is preferable. The proportion of nitrogen in the component (100 mol %) other than the gaseous substance (A) contained in the non-oxidizing atmosphere is preferably 99 mol % or more.

The volume concentration of the gaseous substance (A) is preferably 1% by volume or more, more preferably 2% by volume or more, and still more preferably 5% by volume or more, with respect to the total volume of the gas forming the non-oxidizing atmosphere. If the organic polymer material is subjected to a carbonization treatment in a non-oxidizing atmosphere with a volume concentration of the gaseous substance (A) of 1% by volume or more, the carbonization yield is further improved. In particular, when the volume concentration of the gaseous substance (A) is 2% by volume or more, the carbonization yield is further improved. From the viewpoint of production cost, the volume concentration of the gaseous substance (A) is preferably 30% by volume or less, more preferably 20% by volume or less, and still more preferably 15% by volume or less, with respect to the total volume of the gas forming the non-oxidizing atmosphere.

When considering the balance between the carbonization yield improvement and the production cost, the volume concentration of the gaseous substance (A) is preferably from 2 to 30% by volume, more preferably from 2 to 20% by volume, and still more preferably from 2 to 15% by volume, with respect to the total volume of the gas forming the non-oxidizing atmosphere.

The volume concentration of the non-oxidizing gas is preferably 99% by volume or less, more preferably 98% by volume or less, and still more preferably 95% by volume or less with respect to the total volume of the gas forming the non-oxidizing atmosphere. The volume concentration of the non-oxidizing gas is preferably 70% by volume or more, more preferably 80% by volume or more, and still more preferably 85% by volume or more with respect to the total volume of the gas forming the non-oxidizing atmosphere.

When considering the balance between the carbonization yield improvement and the production cost, the volume concentration of the non-oxidizing gas is preferably from 70 to 98% by volume, more preferably from 80 to 98% by volume, and still more preferably from 85 to 98% by volume, with respect to the total volume of the gas forming the non-oxidizing atmosphere.

The temperature of the carbonization treatment in the first carbonization step is higher than 400° C. and is preferably equal to or higher than 450° C. If the temperature of the carbonization treatment exceeds 400° C., the carbonization yield is improved. The temperature of the carbonization treatment in the first carbonization step is preferably equal to or lower than 1,000° C. If the temperature of the carbonization treatment is equal to or lower than 1,000° C., the carbonization yield can be favorably maintained.

In particular, in the case where the second carbonization step is not carried out after the first carbonization step, in view of favorably maintaining the carbonization yield, the temperature of the carbonization treatment in the first carbonization step is preferably equal to or lower than 1,000° C., and more preferably equal to or lower than 800° C.

In the case where the second carbonization step is carried out after the first carbonization step and the temperature of the carbonization treatment in the second carbonization step is 1,000° C. or higher and lower than 1,200° C., in view of favorably maintaining the carbonization yield, the temperature of the carbonization treatment in the first carbonization step is preferably equal to or lower than 850° C., and more preferably equal to or lower than 800° C.

Further, in the case where the temperature of the carbonization treatment in the second carbonization step is 1,200° C. or higher and lower than 1,400° C., in view of favorably maintaining the carbonization yield, the temperature of the carbonization treatment in the first carbonization step is preferably equal to or lower than 850° C., and more preferably equal to or lower than 800° C.

Furthermore, in the case where the temperature of the carbonization treatment in the second carbonization step is 1,400° C. or higher and 2,000° C. or lower, in view of favorably maintaining the carbonization yield, the temperature of the carbonization treatment in the first carbonization step is preferably equal to or lower than 850° C., and more preferably equal to or lower than 580° C.

The carbonization treatment time in the first carbonization step is preferably 0.5 minutes or more, more preferably 1 minute or more, still more preferably 5 minutes or more, particularly preferably 10 minutes or more, and most preferably 15 minutes or more. When the carbonization treatment time in the first carbonization step is 0.5 minutes or more, it is preferable because the carbonization yield is increased. The carbonization yield tends to be further improved as the carbonization treatment time in the first carbonization step becomes longer, but the improvement in the carbonization yield ceases even if the carbonization treatment time is too long. From the viewpoint of productivity, the carbonization treatment time in the first carbonization step is preferably 300 minutes or less, more preferably 240 minutes or less, and still more preferably 180 minutes or less.

When considering the balance between the carbonization yield improvement and the productivity, the carbonization treatment time in the first carbonization step is preferably from 0.5 to 300 minutes, more preferably from 1 to 240 minutes, still more preferably from 5 to 180 minutes, particularly preferably from 10 to 180 minutes, and most preferably from 15 to 180 minutes.

As a method of the carbonization treatment in the first carbonization step, for example, the organic polymer material (the organic polymer material obtained by subjecting the organic polymer material precursor to the oxidation treatment in the case of carrying out the oxidation step described above before the carbonization step) is caused to pass through a carbonization furnace into which a mixed gas of the gaseous substance (A) and the non-oxidizing gas is introduced and which is set to a temperature exceeding 400° C., thereby heating and carbonizing the organic polymer material.

The temperature of the carbonization treatment may be constant or may be raised as long as it is higher than 400° C. In the case of raising the temperature, for example, a plurality of heating zones are installed in the carbonization furnace, and the temperature of each heating zone is set so that the temperature increases from the heating zone on the upstream side toward the heating zone on the downstream side, and the carbonization treatment can be realized by sequentially passing through and treating the organic polymer material from the heating zone on the upstream side toward the heating zone on the downstream side.

(Second Carbonization Step)

The temperature of the carbonization treatment in the second carbonization step is equal to or higher than 1,000° C., and preferably equal to or higher than 1,200° C. When the temperature of the carbonization treatment is equal to or higher than 1,000° C., the effect of improving heat resistance and mechanical properties can be sufficiently obtained.

When considering the balance between the carbonization yield and the heat resistance and mechanical properties, the temperature of the carbonization treatment in the second carbonization step is preferably equal to or lower than 2,000° C., and more preferably equal to or lower than 1,600° C.

The carbonization treatment time in the second carbonization step is preferably from 0.5 to 30 minutes, and more preferably from 1 to 20 minutes. When the carbonization treatment time in the second carbonization step is 0.5 minutes or more, it is preferable because the mechanical properties of the obtained carbon material are improved, and if it is 30 minutes or less, it is preferable because the mechanical properties of the obtained carbon material are improved and the productivity is increased.

As a method of the carbonization treatment in the second carbonization step, for example, by causing an organic polymer material after the first carbonization step to pass through a carbonization furnace set to a temperature of 1,000° C. or higher and filled with nitrogen gas, the organic polymer material is heated and carbonized.

The temperature of the carbonization treatment may be constant or may be raised as long as it is equal to or higher than 1,000° C. In the case of raising the temperature, for example, a plurality of heating zones are installed in the carbonization furnace, and the temperature of each heating zone is set so that the temperature increases from the heating zone on the upstream side toward the heating zone on the downstream side, and the carbonization treatment can be realized by sequentially passing through and treating the organic polymer material from the heating zone on the upstream side toward the heating zone on the downstream side.

<Other Steps>

The carbon material obtained by the carbonization step can be used as it is as a carbon material, but if necessary, a graphitized material by a known method may be used as the carbon material. For example, a graphitized carbon material can be obtained by heating the carbon material in an inert atmosphere at a maximum temperature exceeding 2,000° C. and not more than 3,000° C.

Further, when the carbon material is a carbon fiber, it is also possible to subject the carbon fiber to a sizing treatment in order to impart convergence thereto.

The sizing agent used for the sizing treatment is not particularly limited as long as desired properties can be obtained, and examples thereof include a sizing agent containing an epoxy resin, a polyether resin, an epoxy-modified polyurethane resin or a polyester resin as a main component. As a method of the sizing treatment, a known method can be used.

<Operation and Effect>

According to the method of the present invention described above for producing a carbon material, since the organic polymer material is heated to a temperature higher than 400° C. to perform a carbonization treatment in a non-oxidizing atmosphere containing a gaseous substance (A) composed of at least one of acetylene and an acetylene derivative, the carbon material can be efficiently produced without lowering the carbonization yield, which in turn makes it possible to reduce the production cost of the carbon material. The reason why the reduction in carbonization yield can be suppressed is considered as follows.

That is, when the organic polymer material is heated to a temperature higher than 400° C. in the non-oxidizing atmosphere to carry out the carbonization treatment, it is thought that acetylene or an acetylene derivative plays a role like an adhesive to suppress breaking away of carbon atoms, and the reduction in carbonization yield can be suppressed. In addition, it is thought that even when a part of the polymer chain constituting the organic polymer material is thermally decomposed during the carbonization treatment and becomes easily removable, reduction in carbonization yield can be suppressed also because the polymer chain which has become easily removable is incorporated into the carbon material due to the action of acetylene or an acetylene derivative.

It should be noted that although the oxidation step in which a precursor fiber (that is, the fibrous organic polymer material precursor) composed of the organic polymer material precursor is subjected to the oxidation treatment is described above, the oxidation treatment may be performed on an organic polymer material precursor which is in a from other than a fiber or being melted or dissolved before subjecting the organic polymer material precursor to the carbonization treatment.

"Carbon Material"

The carbon material of the present invention is a material obtained by the above-described method of the present invention for producing a carbon material.

For example, when the carbon material is a carbon fiber, it is combined with a matrix resin, molded as a composite material, and used for various purposes.

The matrix resin is not particularly limited, and examples thereof include thermosetting resins such as epoxy resins and phenol resins, radical polymerization type resins such as acrylic resins, vinyl ester resins and unsaturated polyester resins, thermoplastic resins such as thermoplastic acrylic resins, polyamide resins, polyimide resins, polycarbonate resins, polypropylene resins and polyethylene resins, and the like. In addition, modified products of these resins can also be used. Further, as a matrix resin, a commercially available product may be used.

The use of the composite material using the carbon fiber composed of the carbon material of the present invention is not particularly limited, and can be used, for example, in a wide range of applications including industrial materials such as automobile members, aerospace materials, materials for sports and leisure, and pressure vessels.

Examples of the applications of the carbon material of the present invention other than the carbon fiber include an electronic member such as a transparent conductive film, a transistor, and a capacitor and a filler agent such as a reinforcing filler and a conductive filler, and the carbon material of the present invention can be used for a wide range of applications.

One aspect of the present invention is a method for producing a carbon material, the method including a step of performing a carbonization treatment (a first carbonization step) by heating an organic polymer material to a temperature exceeding 400° C. in a non-oxidizing atmosphere containing a gaseous substance (A) composed of at least one of acetylene and an acetylene derivative, wherein the volume concentration of the gaseous substance (A) with respect to the total volume of the gas forming the non-oxidizing atmosphere is from 2 to 30% by volume.

Another aspect of the present invention is a method for producing a carbon material, wherein the volume concentration of the gaseous substance (A) with respect to the total volume of the gas forming the nor-oxidizing atmosphere is from 2 to 30% by volume, and the carbonization treatment time in the first carbonization step is from 0.5 to 300 minutes.

Another aspect of the present invention is a method for producing a carbon material, wherein the volume concentration of the gaseous substance (A) with respect to the total volume of the gas forming the nor-oxidizing atmosphere is from 2 to 30% by volume, and the carbonization treatment time in the first carbonization step is from 10 to 180 minutes.

Another aspect of the present invention is a method for producing a carbon material, wherein the volume concentration of the gaseous substance (A) with respect to the total volume of the gas forming the nor-oxidizing atmosphere is from 2 to 30% by volume, and the carbonization treatment time in the first carbonization step is from 15 to 180 minutes.

Another aspect of the present invention is a method for producing a carbon material, wherein the volume concentration of the gaseous substance (A) with respect to the total volume of the gas forming the nor-oxidizing atmosphere is from 2 to 20% by volume, and the carbonization treatment time in the first carbonization step is from 0.5 to 300 minutes.

Another aspect of the present invention is a method for producing a carbon material, wherein the volume concentration of the gaseous substance (A) with respect to the total volume of the gas forming the non-oxidizing atmosphere is from 2 to 20% by volume, and the carbonization treatment time in the first carbonization step is from 10 to 180 minutes.

Another aspect of the present invention is a method for producing a carbon material, wherein the volume concentration of the gaseous substance (A) with respect to the total volume of the gas forming the nor-oxidizing atmosphere is from 2 to 20% by volume, and the carbonization treatment time in the first carbonization step is from 15 to 180 minutes.

Another aspect of the present invention is a method for producing a carbon material, wherein the volume concentration of the gaseous substance (A) with respect to the total volume of the gas forming the non-oxidizing atmosphere is from 2 to 15% by volume, and the carbonization treatment time in the first carbonization step is from 0.5 to 300 minutes.

Another aspect of the present invention is a method for producing a carbon material, wherein the volume concentration of the gaseous substance (A) with respect to the total volume of the gas forming the nor-oxidizing atmosphere is from 2 to 15% by volume, and the carbonization treatment time in the first carbonization step is from 10 to 180 minutes.

Another aspect of the present invention is a method for producing a carbon material, wherein the volume concentration of the gaseous substance (A) with respect to the total volume of the gas forming the nor-oxidizing atmosphere is from 2 to 15% by volume, and the carbonization treatment time in the first carbonization step is from 15 to 180 minutes.

One aspect of the present invention is a method for producing a carbon material, the method includes a step of performing a carbonization treatment (a first carbonization step) by beating an organic polymer material to a temperature higher than 400° C. and not higher than 1,000° C. in a non-oxidizing atmosphere containing a gaseous substance (A) composed of at least one of acetylene and an acetylene derivative, but does not include a step of heating the organic polymer material to a temperature equal to or higher than 1,000° C. in a nitrogen atmosphere after the aforementioned step.

Another aspect of the present invention is a method for producing a carbon material, the method includes a step of performing a carbonization treatment (a first carbonization step) by heating an organic polymer material to a temperature higher than 400° C. and not higher than 1,000° C. in a non-oxidizing atmosphere containing a gaseous substance (A) composed of at least one of acetylene and an acetylene derivative, but does not include a step of heating the organic polymer material to a temperature equal to or higher than 1,000° C. in a nitrogen atmosphere after the aforementioned step, wherein the volume concentration of the gaseous substance (A) with respect to the total volume of the gas forming the non-oxidizing atmosphere is from 2 to 30% by volume, and the carbonization treatment time in the first carbonization step is from 0.5 to 300 minutes.

Another aspect of the present invention is a method for producing a carbon material, the method includes a step of performing a carbonization treatment (a first carbonization step) by heating an organic polymer material to a temperature higher than 400° C. and not higher than 1,000° C. in a no-oxidizing atmosphere containing a gaseous substance (A) composed of at least one of acetylene and an acetylene derivative, but does not include a step of heating the organic polymer material to a temperature equal to or higher than 1,000° C. in a nitrogen atmosphere after the aforementioned step, wherein the volume concentration of the gaseous substance (A) with respect to the total volume of the gas forming the non-oxidizing atmosphere is from 2 to 20% by volume, and the carbonization treatment time in the first carbonization step is from 10 to 180 minutes.

Another aspect of the present invention is a method for producing a carbon material, the method includes a step of performing a carbonization treatment (a first carbonization step) by heating an organic polymer material to a temperature higher than 400° C. and not higher than 1,000° C. in a non-oxidizing atmosphere containing a gaseous substance (A) composed of at least one of acetylene and an acetylene derivative, but does not include a step of heating the organic polymer material to a temperature equal to or higher than 1,000° C. in a nitrogen atmosphere after the aforementioned step, wherein the volume concentration of the gaseous substance (A) with respect to the total volume of the gas forming the non-oxidizing atmosphere is from 2 to 15% by volume, and the carbonization treatment time in the first carbonization step is from 15 to 180 minutes.

One aspect of the present invention is a method for producing a carbon material, the method including a step of performing a carbonization treatment (a first carbonization step) by heating an organic polymer material to a temperature higher than 400° C. and not higher than 850° C. in a non-oxidizing atmosphere containing a gaseous substance (A) composed of at least one of acetylene and an acetylene derivative, and including a step of heating the organic polymer material to a temperature of 1,000 to 2,000° C. in a nitrogen atmosphere after the aforementioned step.

Another aspect of the present invention is a method for producing a carbon material, the method including a step of performing a carbonization treatment (a first carbonization step) by heating an organic polymer material to a temperature higher than 400° C. and not higher than 850° C. in a non-oxidizing atmosphere containing a gaseous substance (A) composed of at least one of acetylene and an acetylene derivative, and including a step of heating the organic polymer material to a temperature of 1,000 to 2,000° C. in a nitrogen atmosphere after the aforementioned step, wherein the volume concentration of the gaseous substance (A) with respect to the total volume of the gas forming the non-oxidizing atmosphere is from 2 to 30% by volume, and the carbonization treatment time in the first carbonization step is from 0.5 to 300 minutes.

Another aspect of the present invention is a method for producing a carbon material, the method including a step of performing a carbonization treatment (a first carbonization step) by heating an organic polymer material to a temperature higher than 400° C. and not higher than 850° C. in a non-oxidizing atmosphere containing a gaseous substance (A) composed of at least one of acetylene and an acetylene derivative, and including a step of heating the organic polymer material to a temperature of 1,000 to 2,000° C. in a nitrogen atmosphere after the aforementioned step, wherein the volume concentration of the gaseous substance (A) with respect to the total volume of the gas forming the non-oxidizing atmosphere is from 2 to 20% by volume, and the carbonization treatment time in the first carbonization step is from 10 to 180 minutes.

Another aspect of the present invention is a method for producing a carbon material, the method including a step of performing a carbonization treatment (a first carbonization step) by heating an organic polymer material to a temperature higher than 400° C. and not higher than 850° C. in a non-oxidizing atmosphere containing a gaseous substance (A) composed of at least one of acetylene and an acetylene derivative, and including a step of heating the organic polymer material to a temperature of 1,000 to 2,000° C. in a nitrogen atmosphere after the aforementioned step, wherein the volume concentration of the gaseous substance (A) with respect to the total volume of the gas forming the non-oxidizing atmosphere is from 2 to 15% by volume, and the carbonization treatment time in the first carbonization step is from 15 to 180 minutes.

EXAMPLES

Hereinafter, the present invention will be described in more detail with reference to examples, although the present invention is not limited thereto.

Example 1

<Production of Precursor Fiber>

An acrylonitrile-based polymer (content of acrylonitrile unit: 96% by mass, content of acrylamide unit: 3% by mass, content of methacrylic acid unit: 1% by mass) was dissolved in dimethylacetamide (DMAC) so as to achieve a concentration of 22% by mass to prepare a spinning dope. This spinning dope was passed through a spinneret having a pore size of 60 μm and a number of holes of 200 and coagulated in a coagulation bath filled with an aqueous DMAC solution with a concentration of 67% by mass at a temperature of 35° C. to obtain a coagulated yarn. The coagulated yarn thus obtained was stretched while desolvating in warm water, and then an amino-modified silicone oil agent was applied. The resultant was further stretched in pressurized steam to obtain a precursor fiber composed of an organic polymer material precursor having a number of single fibers of 200 and a single fiber fineness of 1.2 dtex.

<Production of Carbon Fiber>

The obtained precursor fiber was subjected to a flame-resistant treatment by heating it in air at a temperature of 260° C. under tension for 20 minutes as a heating time to obtain a precursor fiber having a density (ρ) of 1.335 g/cm$^3$ (a flame-resistant fiber) (an oxidation step).

Subsequently, using a thermogravimetric apparatus ("STA 7300" manufactured by Hitachi High-Technologies Corporation) provided with a mixed gas introduction path, a mixed gas composed of acetylene gas ("Dissolved acetylene, special grade for atomic absorption spectroscopy" manufactured by Toho Acetylene Co., Ltd.) as a gaseous substance (A) and nitrogen gas ("High purity nitrogen gas G2 grade" manufactured by Taiyo Nippon Sanso Corporation) as a non-oxidizing gas (volume concentration of acetylene gas: 2.4% by volume, volume concentration of nitrogen gas: 97.6% by volume) was introduced into this apparatus, while heating the flame-resistant fiber. More specifically, while the mixed gas was being introduced, the temperature was maintained at 30° C. for 45 minutes, then the temperature was raised from 30° C. to 380° C. at a rate of temperature increase of 50° C./min, and the temperature was further raised from 380° C. to 400° C. at rate of 10° C./min. After reaching 400° C., the temperature was held at 400° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 400° C. for 20 minutes, and then the temperature was raised at a rate of temperature increase of 10° C./min up to the maximum reaching temperature of 1,400° C. to obtain a carbon fiber.

The carbonization yield was calculated from the weight change of the fiber due to rise in the ambient temperature. More specifically, the carbonization yield was calculated by dividing the difference between the weight of the flame-resistant fiber before the temperature rise and the weight of the fiber at each temperature by the weight of the flame-resistant fiber before the temperature rise. FIG. 1 shows a graph obtained by plotting the carbonization yield (vertical axis) against the temperature (horizontal axis). Further, the carbonization yields at temperatures of 1,000° C., 1,200° C. and 1,400° C. are shown in Table 1.

Example 2

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was being introduced, the temperature was maintained at 30° C. for 45 minutes and then the temperature was raised from 30° C. to 450° C. at a rate of temperature increase of 50° C./min. After reaching 450° C., the temperature was held at 450° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 450° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 3

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was being introduced, the temperature was maintained at 30° C. for 45 minutes, then the temperature was raised from 30° C. to 480° C. at a rate of temperature increase of 50° C./min, and the temperature was further raised from 480° C. to 500° C. at a rate of 10° C./min. After reaching 500° C., the temperature was held at 500° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 500° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 4

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was being introduced, the temperature was maintained at 30° C. for 45 minutes and the temperature was raised from 30° C. to 550° C. at a rate of temperature increase of 50° C./min. After reaching 550° C., the temperature was held at 550° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 550° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 5

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was introduced, the temperature was maintained at 30° C. for 45 minutes, the temperature was raised from 30° C. to 580° C. at a rate of temperature increase of 50° C./min, and the temperature was further raised from 580° C. to 600° C. at a rate of 10° C./min. After reaching 600° C., the temperature was held at 600° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 600° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 6

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was being introduced, the temperature was maintained at 30° C. for 45 minutes, the temperature was raised from 30° C. to 680° C. at a rate of temperature increase of 50° C./min, and the temperature was further raised from 680° C. to 700° C.

at a rate of 10° C./min. After reaching 700° C., the temperature was held at 700° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 700° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 7

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was being introduced, the temperature was maintained at 30° C. for 45 minutes, the temperature was raised from 30° C. to 780° C. at a rate of temperature increase of 50° C./min, and the temperature was further raised from 780° C. to 800° C. at a rate of 10° C./min. After reaching 800° C., the temperature was held at 800° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 800° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 8

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was being introduced, the temperature was maintained at 30° C. for 45 minutes and the temperature was raised from 30° C. to 850° C. at a rate of temperature increase of 50° C./min. After reaching 850° C., the temperature was held at 850° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 850° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 9

A flame-resistant fiber was obtained in the same manner as in Example 1.

Subsequently, the flame-resistant fiber was heated while introducing the mixed gas (volume concentration of acetylene gas: 2.4% by volume, volume concentration of nitrogen gas: 97.6% by volume) into the same apparatus as in Example 1. More specifically, while the mixed gas was being introduced, the temperature was maintained at 30° C. for 45 minutes, the temperature was raised from 30° C. to 880° C. at a rate of temperature increase of 50° C./min, and the temperature was further raised from 880° C. to 900° C. at a rate of 10° C./min. After reaching 900° C., the temperature was held at 900° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 900° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 1, and a graph obtained by plotting the carbonization yield (vertical axis) against the temperature (horizontal axis) is shown in FIG. 1. Further, the carbonization yields at temperatures of 1,000° C., 1,200° C. and 1,400° C. are shown in Table 1.

Example 10

Figure 2:
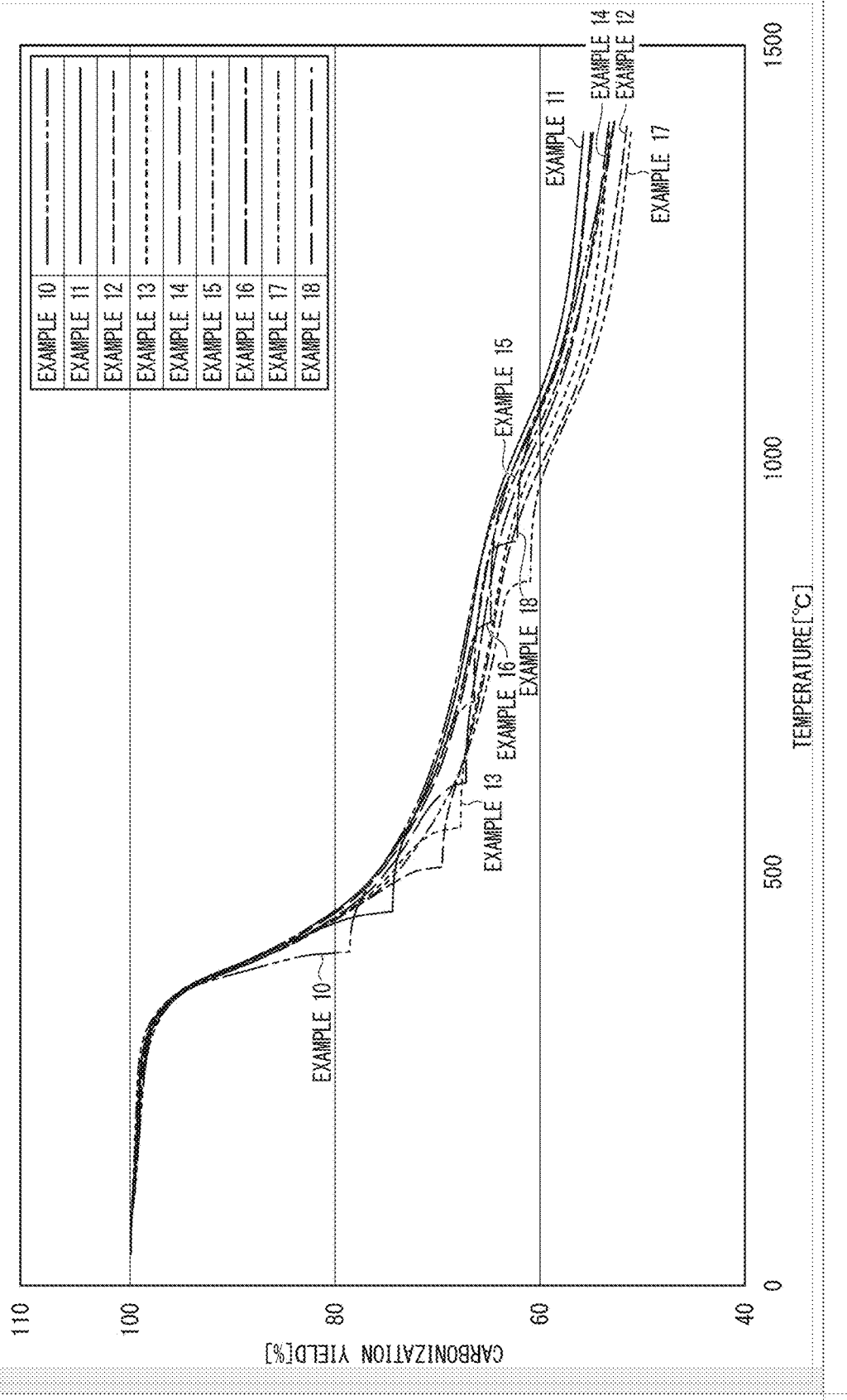
FIG. 2 is a graph obtained by plotting the carbonization yield (vertical axis) against the temperature (horizontal axis) for Examples 10 to 18.

A carbon fiber was produced in the same manner as in Example 1 except that nitrogen gas ("High purity nitrogen gas G2 grade" manufactured by Taiyo Nippon Sanso Corporation) was used instead of the mixed gas. The results are shown in FIG. 2 and Table 1.

Example 11

A carbon fiber was produced in the same manner as in Example 2 except that nitrogen gas ("High purity nitrogen gas G2 grade" manufactured by Taiyo Nippon Sanso Corporation) was used instead of the mixed gas. The results are shown in FIG. 2 and Table 1.

Example 12

A carbon fiber was produced in the same manner as in Example 3 except that nitrogen gas ("High purity nitrogen gas G2 grade" manufactured by Taiyo Nippon Sanso Corporation) was used instead of the mixed gas. The results are shown in FIG. 2 and Table 1.

Example 13

A carbon fiber was produced in the same manner as in Example 4 except that nitrogen gas ("High purity nitrogen gas G2 grade" manufactured by Taiyo Nippon Sanso Corporation) was used instead of the mixed gas. The results are shown in FIG. 2 and Table 1.

Example 14

A carbon fiber was produced in the same manner as in Example 5 except that nitrogen gas ("High purity nitrogen gas G2 grade" manufactured by Taiyo Nippon Sanso Corporation) was used instead of the mixed gas. The results are shown in FIG. 2 and Table 1.

Example 15

A carbon fiber was produced in the same manner as in Example 6 except that nitrogen gas ("High purity nitrogen gas G2 grade" manufactured by Taiyo Nippon Sanso Corporation) was used instead of the mixed gas. The results are shown in FIG. 2 and Table 1.

Example 16

A carbon fiber was produced in the same manner as in Example 7 except that nitrogen gas ("High purity nitrogen gas G2 grade" manufactured by Taiyo Nippon Sanso Corporation) was used instead of the mixed gas. The results are shown in FIG. 2 and Table 1.

Example 17

A carbon fiber was produced in the same manner as in Example 8 except that nitrogen gas ("High purity nitrogen gas G2 grade" manufactured by Taiyo Nippon Sanso Corporation) was used instead of the mixed gas. The results are shown in FIG. 2 and Table 1.

Example 18

A carbon fiber was produced in the same manner as in Example 9 except that nitrogen gas ("High purity nitrogen gas G2 grade" manufactured by Taiyo Nippon Sanso Corporation) was used instead of the mixed gas. The results are shown in FIG. 2 and Table 1.

Example 19

<Production of Carbon Fiber>

A precursor fiber composed of an organic polymer material precursor was produced in the same manner as in Example 1.

The obtained precursor fiber was subjected to a flame-resistant treatment by heating it in air at a temperature of 260° C. under tension for 30 minutes as a heating time to obtain a precursor fiber with a density ($\rho$) of 1.356 g/cm$^3$ (flame-resistant fiber) (an oxidation step).

Subsequently, using a thermogravimetric apparatus ("STA 7300" manufactured by Hitachi High-Technologies Corporation) provided with a mixed gas introduction path, a mixed gas composed of acetylene gas ("Dissolved acetylene, special grade for atomic absorption spectroscopy" manufactured by Toho Acetylene Co., Ltd.) as a gaseous substance (A) and nitrogen gas ("High purity nitrogen gas G2 grade" manufactured by Taiyo Nippon Sanso Corporation) as a non-oxidizing gas (volume concentration of acetylene gas: 2.4% by volume, volume concentration of nitrogen gas: 97.6% by volume) was introduced into this apparatus, while heating the flame-resistant fiber. More specifically, while the mixed gas was being introduced, the temperature was maintained at 30° C. for 45 minutes, the temperature was raised from 30° C. to 380° C. at a rate of temperature increase of 50° C./min, and the temperature was further raised from 380° C. to 400° C. at a rate of 10° C./min. After reaching 400° C., the temperature was held at 400° C. for 20 minutes (a first carbonization step).

Subsequently, the atmosphere inside the apparatus was replaced with nitrogen gas ("High purity nitrogen gas (2 grade" manufactured by Taiyo Nippon Sanso Corporation) from the mixed gas, and further held at 400° C. for 20 minutes, and then the temperature was raised at a rate of temperature increase of 0° C./min up to the maximum reaching temperature of 1,400° C. to obtain a carbon fiber.

The carbonization yield was calculated from the weight change of the fiber due to rise in the ambient temperature. More specifically, the carbonization yield was calculated by dividing the difference between the weight of the flame-resistant fiber before the temperature rise and the weight of

TABLE 1

Figure 3:
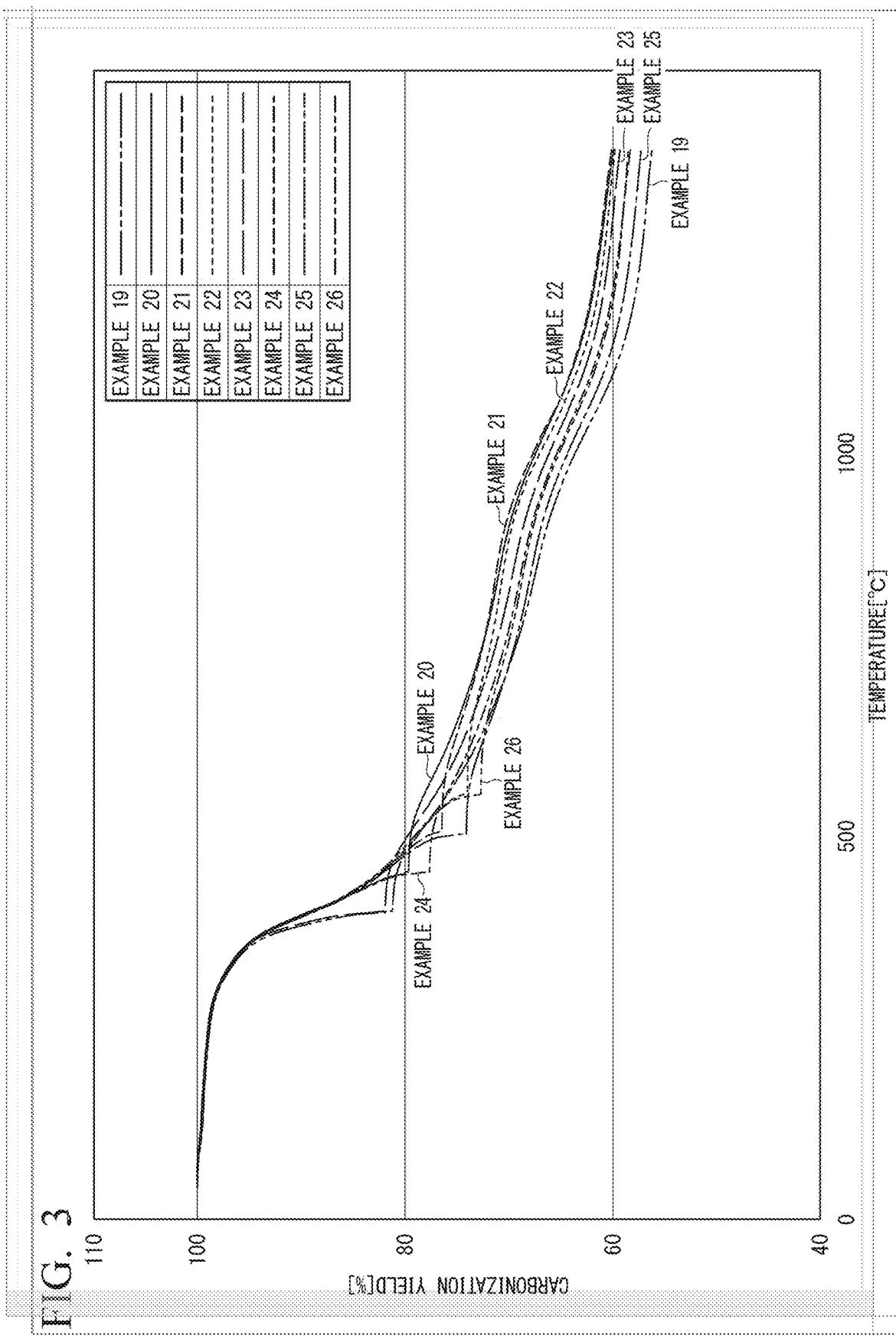
FIG. 3 is a graph obtained by plotting the carbonization yield (vertical axis) against the temperature (horizontal axis) for Examples 19 to 26.

|  | Acetylene gas concentration [% by volume] in mixed gas | Holding temperature in first carbonization step [° C.] | Carbonization yield [%] | | |
| --- | --- | --- | --- | --- | --- |
|  |  |  | 1,000° C. | 1,200° C. | 1,400° C. |
| Example 1 | 2.4 | 400 | 63.4 | 57.0 | 53.0 |
| Example 2 | 2.4 | 450 | 64.0 | 58.4 | 56.5 |
| Example 3 | 2.4 | 500 | 65.6 | 60.1 | 57.2 |
| Example 4 | 2.4 | 550 | 64.0 | 57.7 | 55.4 |
| Example 5 | 2.4 | 600 | 63.8 | 57.7 | 53.8 |
| Example 6 | 2.4 | 700 | 65.7 | 58.7 | 52.8 |
| Example 7 | 2.4 | 800 | 66.2 | 60.5 | 58.9 |
| Example 8 | 2.4 | 850 | 65.1 | 59.9 | 59.0 |
| Example 9 | 2.4 | 900 | 58.4 | 54.2 | 52.9 |
| Example 10 | 0 | 400 | 62.2 | 56.3 | 52.8 |
| Example 11 | 0 | 450 | 62.8 | 57.4 | 55.8 |
| Example 12 | 0 | 500 | 59.6 | 54.0 | 51.5 |
| Example 13 | 0 | 550 | 60.4 | 54.8 | 53.3 |
| Example 14 | 0 | 600 | 61.1 | 55.8 | 53.3 |
| Example 15 | 0 | 700 | 61.7 | 55.8 | 53.3 |
| Example 16 | 0 | 800 | 62.3 | 56.7 | 55.1 |
| Example 17 | 0 | 850 | 59.1 | 53.2 | 51.2 |
| Example 18 | 0 | 900 | 61.6 | 56.7 | 54.9 | the fiber at each temperature by the weight of the flame-resistant fiber before the temperature rise. FIG. 3 shows a graph obtained by plotting the carbonization yield (vertical axis) against the temperature (horizontal axis). Further, the carbonization yields at temperatures of 1,000° C., 1,200° C. and 1,400° C. are shown in Table 2.

Example 20

A flame-resistant fiber was obtained in the same manner as in Example 19.

Subsequently, the flame-resistant fiber was heated while introducing the mixed gas (volume concentration of acetylene gas: 2.4% by volume, volume concentration of nitrogen gas: 97.6% by volume) into the same apparatus as in Example 19. More specifically, while the mixed gas was being introduced, the temperature was maintained at 30° C. for 45 minutes and the temperature was raised from 30° C. to 450° C. at a rate of temperature increase of 50° C./min. After reaching 450° C., the temperature was held at 450° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further kept at 450° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 19, and a graph obtained by plotting the carbonization yield (vertical axis) against the temperature (horizontal axis) is shown in FIG. 3. Further, the carbonization yields at temperatures of 1,000° C., 1,200° C. and 1,400° C. are shown in Table 2.

Example 21

A flame-resistant fiber was obtained in the same manner as in Example 19.

Subsequently, the flame-resistant fiber was heated while introducing the mixed gas (volume concentration of acetylene gas: 2.4% by volume, volume concentration of nitrogen gas: 97.6% by volume) into the same apparatus as in Example 19. More specifically, while the mixed gas was introduced, the temperature was maintained at 30° C.: for 45 minutes, the temperature was raised from 30° C. to 480° C. at a rate of temperature increase of 50° C./imin, and the temperature was further raised from 480° C. to 500° C. at a rate of 10° C./min. After reaching 500° C., the temperature was held at 500° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 500° C. for 20 minutes, and then the temperature was raised at a rate of temperature increase of 10° C./min up to the maximum reaching temperature of 1,400° C. to obtain a carbon fiber.

The carbonization yield was calculated in the same manner as in Example 19, and a graph obtained by plotting the carbonization yield (vertical axis) against the temperature (horizontal axis) is shown in FIG. 3. Further, the carbonization yields at temperatures of 1,000° C., 1,200° C. and 1,400° C. are shown in Table 2.

Example 22

A flame-resistant fiber was obtained in the same manner as in Example 19.

Subsequently, the flame-resistant fiber was heated while introducing the mixed gas (volume concentration of acetylene gas: 2.4% by volume, volume concentration of nitrogen gas: 97.6% by volume) into the same apparatus as in Example 19. More specifically, while the mixed gas was being introduced, the temperature was maintained at 30° C. for 45 minutes and the temperature was raised from 30° C. to 550° C. at a rate of temperature increase of 50° C./min. After reaching 550° C., the temperature was held at 550° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 550° C. for 20 minutes, and then the temperature was raised at a rate of temperature increase of 10° C. min up to the maximum reaching temperature of 1,400° C. to obtain a carbon fiber.

The carbonization yield was calculated in the same manner as in Example 19, and a graph obtained by plotting the carbonization yield (vertical axis) against the temperature (horizontal axis) is shown in FIG. 3. Further, the carbonization yields at temperatures of 1,000° C., 1,200° C. and 1,400° C. are shown in Table 2.

Example 23

A carbon fiber was produced in the same manner as in Example 19 except that nitrogen gas ("High purity nitrogen gas G2 grade" manufactured by Taiyo Nippon Sanso Corporation) was used instead of the mixed gas. The results are shown in FIG. 3 and Table 2.

Example 24

A carbon fiber was produced in the same manner as in Example 20 except that nitrogen gas ("High purity nitrogen gas G2 grade" manufactured by Taiyo Nippon Sanso Corporation) was used instead of the mixed gas. The results are shown in FIG. 3 and Table 2.

Example 25

A carbon fiber was produced in the same manner as in Example 21 except that nitrogen gas ("High purity nitrogen gas G2 grade" manufactured by Taiyo Nippon Sanso Corporation) was used instead of the mixed gas. The results are shown in FIG. 3 and Table 2.

Example 26

A carbon fiber was produced in the same manner as in Example 22 except that nitrogen gas ("High purity nitrogen gas G2 grade" manufactured by Taiyo Nippon Sanso Corporation) was used instead of the mixed gas. The results are shown in FIG. 3 and Table 2.

TABLE 2

| | Acetylene gas concentration [% by volume] in mixed gas | Holding temperature in first carbonization step [° C.] | Carbonization yield [%] | | |
|---|---|---|---|---|---|
| | | | 1,000° C. | 1,200° C. | 1,400° C. |
| Example 19 | 2.4 | 400 | 63.6 | 57.9 | 56.2 |
| Example 20 | 2.4 | 450 | 67.5 | 62.0 | 59.9 |
| Example 21 | 2.4 | 500 | 67.7 | 62.1 | 60.1 |
| Example 22 | 2.4 | 550 | 67.1 | 61.5 | 59.8 |
| Example 23 | 0 | 400 | 66.2 | 61.0 | 59.3 |
| Example 24 | 0 | 450 | 65.4 | 60.1 | 58.3 |
| Example 25 | 0 | 500 | 64.3 | 59.0 | 57.3 |
| Example 26 | 0 | 550 | 65.2 | 60.0 | 58.5 |

Example 27

A flame-resistant fiber was obtained in the same manner as in Example 1.

Subsequently, using a thermogravimetric apparatus ("STA 7300" manufactured by Hitachi High-Technologies Corporation) provided with a mixed gas introduction path, a mixed gas composed of acetylene gas ("Dissolved acetylene, special grade for atomic absorption spectroscopy" manufactured by Toho Acetylene Co., Ltd.) as a gaseous substance (A) and nitrogen gas ("High purity nitrogen gas G2 grade" manufactured by Taiyo Nippon Sanso Corporation) as a non-oxidizing gas (volume concentration of acetylene gas: 2.4% by volume, volume concentration of nitrogen gas: 97.6% by volume) was introduced into this apparatus, while heating the flame-resistant fiber. More specifically, while the mixed gas was being introduced, the temperature was maintained at 30° C. for 45 minutes, the temperature was raised from 30° C. to 300° C. at a rate of temperature increase of 50° C./min, and then the temperature was raised at a rate of 20° C./min up to the maximum reaching temperature of 1,400° C. to obtain a carbon fiber.

Figure 4:
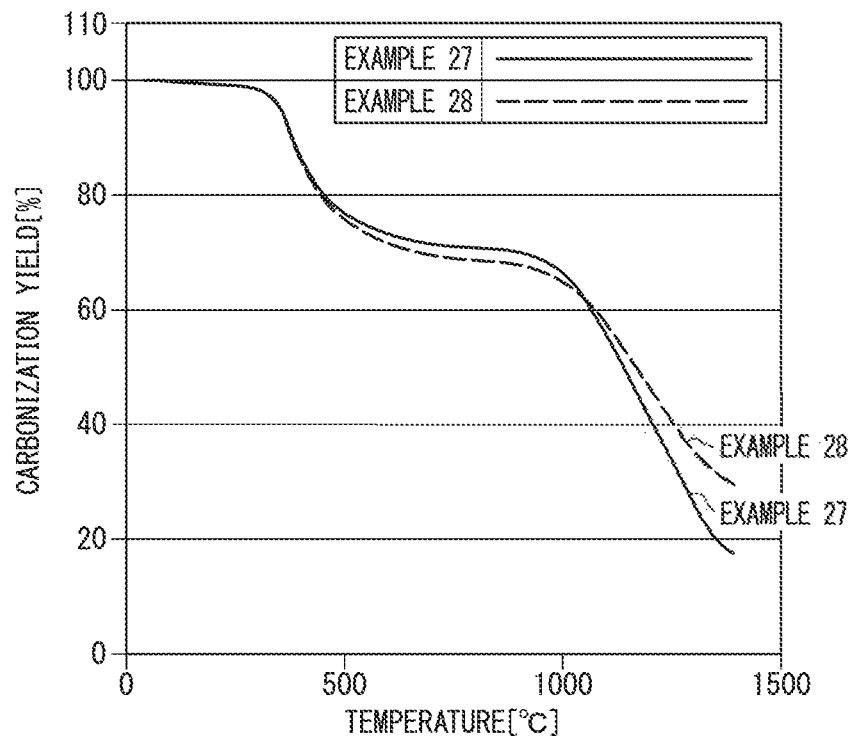
FIG. 4 is a graph obtained by plotting the carbonization yield (vertical axis) against the temperature (horizontal axis) for Examples 27 and 28.

The carbonization yield was calculated from the weight change of the fiber due to rise in the ambient temperature. More specifically, the carbonization yield was calculated by dividing the difference between the weight of the flame-resistant fiber before the temperature rise and the weight of the fiber at each temperature by the weight of the flame-resistant fiber before the temperature rise. FIG. 4 shows a graph obtained by plotting the carbonization yield (vertical axis) against the temperature (horizontal axis). Further, the carbonization yields at temperatures of 1,000° C. and 1,200° C. are shown in Table 3.

Example 28

A carbon fiber was produced in the same manner as in Example 27 except that a mixed gas composed of acetylene gas ("Dissolved acetylene, special grade for atomic absorption spectroscopy" manufactured by Toho Acetylene Co., Ltd.) and nitrogen gas ("High purity nitrogen gas G2 grade" manufactured by Taiyo Nippon Sanso Corporation) (volume concentration of acetylene gas: 1.2% by volume, volume concentration of nitrogen gas: 98.8% by volume) was used as a mixed gas. The results are shown in FIG. 4 and Table 3.

TABLE 3

| | Acetylene gas concentration [% by volume] in mixed gas | Carbonization yield [%] | |
|---|---|---|---|
| | | 1,000° C. | 1,200° C. |
| Example 27 | 2.4 | 66.3 | 40.8 |
| Example 28 | 1.2 | 64.8 | 46.2 |

Example 29

As an organic polymer material, alkali lignin in the form of a powder was used, and a carbon material was produced as follows.

Using a thermogravimetric apparatus ("STA 7300" manufactured by Hitachi High-Technologies Corporation) provided with a mixed gas introduction path, a mixed gas composed of acetylene gas ("Dissolved acetylene, special grade for atomic absorption spectroscopy" manufactured by Toho Acetylene Co., Ltd.) as a gaseous substance (A) and nitrogen gas ("High purity nitrogen gas G2 grade" manufactured by Taiyo Nippon Sanso Corporation) as a non-oxidizing gas (volume concentration of acetylene gas: 2.4% by volume, volume concentration of nitrogen gas: 97.6% by volume) was introduced into this apparatus, while heating the alkali lignin. More specifically, while the mixed gas was being introduced, the temperature was maintained at 30° C. for 45 minutes, the temperature was raised from 30° C. to 500° C. at a rate of temperature increase of 50° C./min. After reaching 500° C., the temperature was held at 500° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 500° C. for 20 minutes, and then the temperature was raised at a rate of temperature increase of 20° C./min up to the maximum reaching temperature of 1,400° C. to obtain a carbon material.

Figure 5:
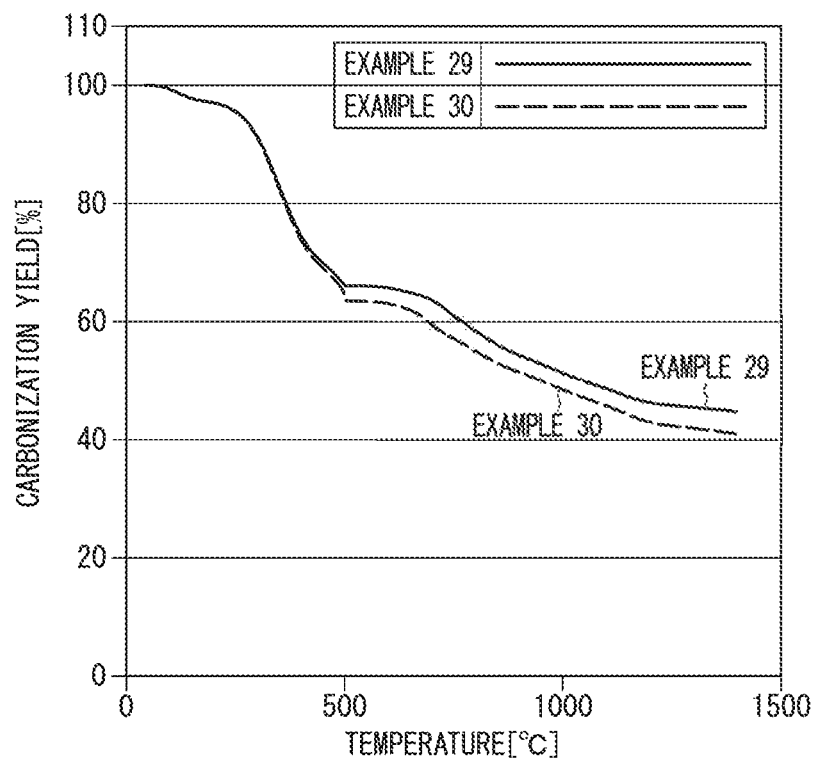
FIG. 5 is a graph obtained by plotting the carbonization yield (vertical axis) against the temperature (horizontal axis) fir Examples 29 and 30.

The carbonization yield was calculated from the weight change of the powder due to rise in the ambient temperature. More specifically, the carbonization yield was calculated by dividing the difference between the weight of the alkali lignin before the temperature rise and the weight of the alkali lignin at each temperature by the weight of the alkali lignin before the temperature rise. FIG. 5 shows a graph obtained by plotting the carbonization yield (vertical axis) against the temperature (horizontal axis). Further, the carbonization yields at temperatures of 1,000° C., 1,200° C. and 1,400° C. are shown in Table 4.

Example 30

A carbon material was produced in the same manner as in Example 29 except that nitrogen gas ("High purity nitrogen gas G2 grade" manufactured by Taiyo Nippon Sanso Corporation) was used instead of the mixed gas. The results are shown in FIG. 5 and Table 4.

TABLE 4

| | Acetylene gas concentration [% by volume] in mixed gas | Holding temperature in first carbonization step [° C.] | Carbonization yield [%] | | |
|---|---|---|---|---|---|
| | | | 1,000° C. | 1,200° C. | 1,400° C. |
| Example 29 | 2.4 | 500 | 51.1 | 46.3 | 44.9 |
| Example 30 | 0 | 500 | 48.4 | 42.9 | 41.1 |

Example 31

A flame-resistant fiber was obtained in the same manner as in Example 1.

Subsequently, using a thermogravimetric apparatus ("STA 7300" manufactured by Hitachi High-Technologies Corporation) provided with a mixed gas introduction path, a mixed gas composed of acetylene gas ("Dissolved acetylene, special grade for atomic absorption spectroscopy" manufactured by Toho Acetylene Co., Ltd.) as a gaseous substance (A) and nitrogen gas ("High purity nitrogen gas G2 grade" manufactured by Taiyo Nippon Sanso Corporation) as a non-oxidizing gas (volume concentration of acetylene gas: 10% by volume, volume concentration of nitrogen gas: 90% by volume) was introduced into this apparatus, while heating the flame-resistant fiber. More specifically, in a state in which the mixed gas was introduced, the temperature was raised from 30° C. to 150° C. at a rate of temperature increase of 100° C./min, the temperature was maintained at 150° C. for 30 minutes and then the temperature was raised from 150° C. to 500° C. at a rate of temperature increase of 50° C./min. After reaching 500° C., the temperature was held at 500° C. for 20 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 500° C. for 20 minutes, and then the temperature was raised at a rate of temperature increase of 10° C./min up to the maximum reaching temperature of 1,400° C. to obtain a carbon fiber.

Figure 6:
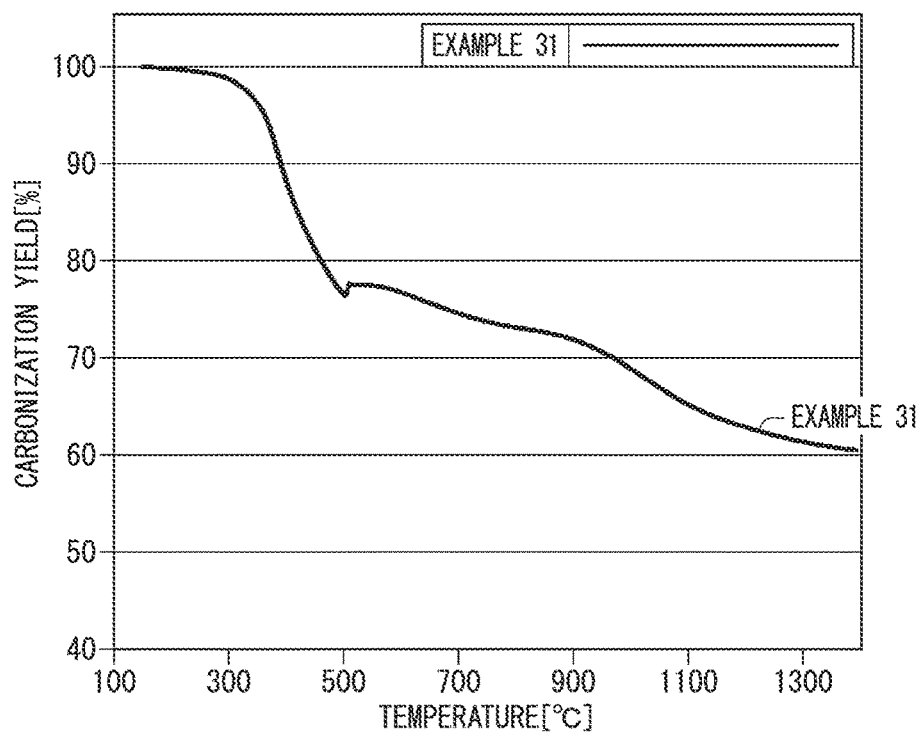
FIG. 6 is a graph obtained by plotting the carbonization yield (vertical axis) against the temperature (horizontal axis) fir Example 31.

The carbonization yield was calculated from the weight change of the fiber due to rise in the ambient temperature at 150° C. or higher. More specifically, the carbonization yield was calculated by dividing the difference between the weight of the flame-resistant fiber after being held at 150° C. for 30 minutes and the weight of the fiber at each temperature by the weight of the flame-resistant fiber after being held at 150° C. for 30 minutes. FIG. 6 shows a graph obtained by plotting the carbonization yield (vertical axis) against the temperature (horizontal axis). Further, the carbonization yields at temperatures of 1,000° C., 1,200° C., 1,300° C. and 1,390° C. are shown in Table 5.

Example 32

A flame-resistant fiber was obtained in the same manner as in Example 1.

Subsequently, the flame-resistant fiber was heated while introducing the mixed gas (volume concentration of acetylene gas: 10% by volume, volume concentration of nitrogen gas: 90% by volume) into the same apparatus as in Example 31. More specifically, in a state in which the mixed gas was introduced, the temperature was raised from 30° C. to 150° C. at a rate of temperature increase of 100° C./min, the temperature was maintained at 150° C. for 30 minutes and then the temperature was raised from 150° C. to 500° C. at a rate of temperature increase of 50° C./min. After reaching 500° C., the temperature was held at 500° C. for 150 minutes (a first carbonization step).

Subsequently, the atmosphere inside the apparatus was replaced with nitrogen gas ("High purity nitrogen gas G2 grade" manufactured by Taiyo Nippon Sanso Corporation) from the mixed gas, and further held at 500° C. for 20 minutes, and then the temperature was raised at a rate of temperature increase of 10° C./min up to the maximum reaching temperature of 1,400° C. to obtain a carbon fiber.

Figure 7:
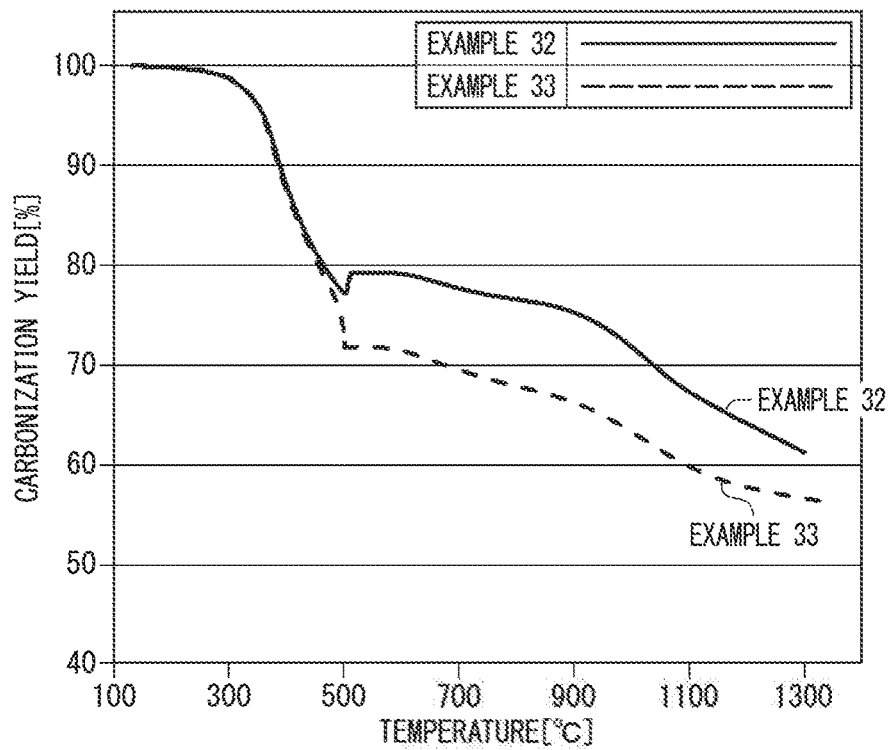
FIG. 7 is a graph obtained by plotting the carbonization yield (vertical axis) against the temperature (horizontal axis) for Examples 32 and 33.

The carbonization yield was calculated in the same manner as in Example 31, and a graph obtained by plotting the carbonization yield (vertical axis) against the temperature (horizontal axis) is shown in FIG. 7. Further, the carbonization yields at temperatures of 1,000° C., 1,200° C. and 1,300° C. are shown in Table 5.

Example 33

A carbon fiber was produced in the same manner as in Example 32 except that nitrogen gas ("High purity nitrogen gas G2 grade" manufactured by Taiyo Nippon Sanso Corporation) was used instead of the mixed gas. The results are shown in FIG. 7 and Table 5.

TABLE 5

| | Acetylene gas concentration [% by volume] in mixed gas | First carbonization step | | Carbonization yield [%] | | | |
|---|---|---|---|---|---|---|---|
| | | Holding temperature [° C.] | Holding time [min] | 1,000° C. | 1,200° C. | 1,300° C. | 1,390° C. |
| Ex. 31 | 10 | 500 | 20 | 69.0 | 63.1 | 61.6 | 60.8 |
| Ex. 32 | 10 | 500 | 150 | 71.7 | 64.0 | 61.1 | — |
| Ex. 33 | 0 | 500 | 150 | 63.1 | 57.6 | 56.4 | — |

Example 34

A flame-resistant fiber was obtained in the same manner as in Example 1.

Subsequently, using a thermogravimetric apparatus ("STA 7300" manufactured by Hitachi High-Technologies Corporation) provided with a mixed gas introduction path, a mixed gas composed of acetylene gas ("Dissolved acetylene, special grade for atomic absorption spectroscopy" manufactured by Toho Acetylene Co., Ltd.) as a gaseous substance (A) and nitrogen gas ("High purity nitrogen gas G2 grade" manufactured by Taiyo Nippon Sanso Corporation) as a non-oxidizing gas (volume concentration of acetylene gas: 2.4% by volume, volume concentration of nitrogen gas: 97.6% by volume) was introduced into this apparatus, while heating the flame-resistant fiber. More specifically, while the mixed gas was being introduced, the temperature was maintained at 30° C. for 45 minutes and the temperature was raised from 30° C. to 500° C. at a rate of temperature increase of 50° C./min. After reaching 500° C., the temperature was held at 500° C. for 40 minutes.

Subsequently, the temperature was raised at a rate of temperature increase of 10° C./min up to the maximum reaching temperature of 1,200° C. to obtain a carbon fiber (a first carbonization step).

Figure 8:
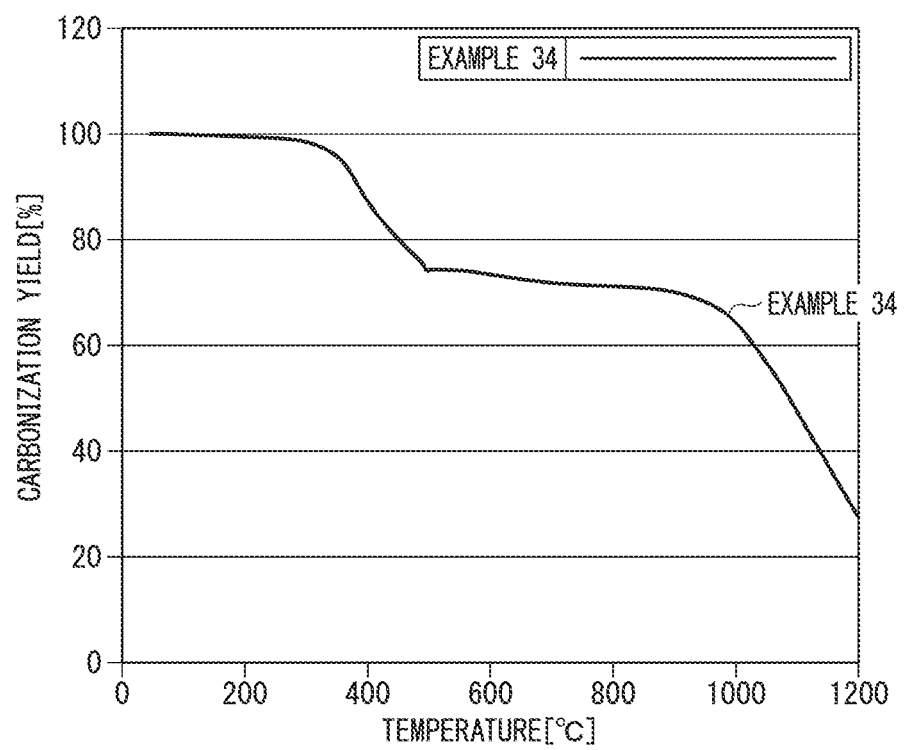
FIG. 8 is a graph obtained by plotting the carbonization yield (vertical axis) against the temperature (horizontal axis) for Example 34.

The carbonization yield was calculated from the weight change of the fiber due to rise in the ambient temperature. More specifically, the carbonization yield was calculated by dividing the difference between the weight of the flame-resistant fiber before the temperature rise and the weight of the fiber at each temperature by the weight of the flame-resistant fiber before the temperature rise. FIG. 8 shows a graph obtained by plotting the carbonization yield (vertical axis) against the temperature (horizontal axis).

As a result, the carbonization yield at a temperature of 1,000° C. was 64.3%, and the carbonization yield at 1.200° C. was 27.6%.

In the case of Example 34, although the carbonization yield at 1,000° C. was as high as 64.3%, when the temperature was further raised in the mixed gas atmosphere containing acetylene gas, the carbonization yield tended to decrease gradually. The reason why decomposition is promoted by placing the flame-resistant fiber in an atmosphere of a mixed gas containing acetylene gas at a temperature exceeding 1,000° C. as described above is considered as follows.

That is, in the process of carbonizing the flame-resistant fiber at a high temperature, although a polycyclic aromatic hydrocarbon structure is formed in the flame-resistant fiber, which further develops to form a graphite structure, it is thought that when acetylene is present in an atmosphere in which the treatment temperature exceeds 1,000° C., for example, linear polycyclic aromatic hydrocarbons (11) such as anthracene type and naphthacene type react with acetylene (12) as shown schematically in the following formula (1) to form an intermediate (13), and the aromatic hydrocarbon is eliminated from the intermediate (13), which hinders the formation of the graphite structure, thereby reducing the carbonization yield.

[Chemical Formula 1]

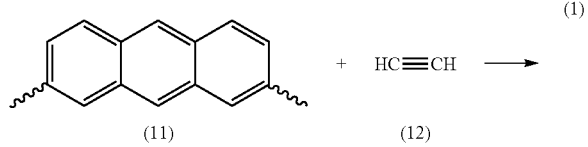

(1)

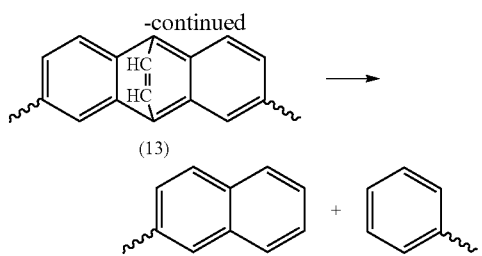

It should be noted that although the temperature was raised above 1,000° C. (more specifically, up to 1,400° C.) in the atmosphere of a mixed gas containing acetylene gas also in Examples 27 and 28, in the cases of Examples 27 and 28, the carbonization yields at 1,200° C. were higher than that in Example 34. This is because it was 20° C./min in Examples 27 and 28 whereas the rate of temperature increase above 1,000° C. was 10° C./min in Example 34, namely, the rate of temperature increase in Examples 27 and 28 was faster than that in Example 34. That is, in the cases of Examples 27 and 28, the time to be exposed to an atmosphere of a mixed gas containing acetylene gas at a temperature exceeding 1,000° C. is shorter than that in Example 34. Therefore, it is considered that the reaction shown in the above formula (1) hardly proceeded, and the reduction in carbonization yield was suppressed as compared with Example 34.

INDUSTRIAL APPLICABILITY

According to the method for producing a carbon material of the present invention, the carbon material can be efficiently produced without lowering the carbonization yield.

The invention claimed is:

1. A method for producing a carbon material, the method comprising:
   performing a first carbonization treatment by heating an organic polymer material to a temperature in a range of 400° C. to 850° C. in a non-oxidizing atmosphere comprising a gaseous substance (A) comprising at least one of acetylene and an acetylene derivative, forming a first carbonized polymer material; and
   performing a second carbonization treatment by heating the first carbonized polymer material to a temperature equal to or higher than 1,000° C. in a nitrogen atmosphere.

2. The method for producing a carbon material according to claim 1, wherein the organic polymer material comprises a vinyl-based polymer.

3. The method for producing a carbon material according to claim 2, wherein the vinyl-based polymer comprises at least one of an acrylonitrile-based polymer and a derivative of an acrylonitrile-based polymer.

4. The method for producing a carbon material according to claim 2, wherein the vinyl-based polymer comprises at least one of an olefin-based polymer and a derivative of an olefin-based polymer.

5. The method for producing a carbon material according to claim 4, wherein the olefin-based polymer comprises at least one of polyethylene and polypropylene.

6. The method for producing a carbon material according to claim 1, the method further comprising:
   subjecting an organic polymer material precursor to an oxidation treatment to obtain the organic polymer material before performing the first carbonization treatment.

7. The method for producing a carbon material according to claim 6, wherein the oxidation treatment comprises performing an oxidation treatment by heating the organic polymer material precursor to a temperature of 200 to 350° C. in an oxidizing atmosphere for 10 to 80 minutes.

8. The method for producing a carbon material according to claim 6, wherein the organic polymer material precursor comprises a vinyl-based polymer.

9. The method for producing a carbon material according to claim 8, wherein the vinyl-based polymer comprises at least one of an acrylonitrile-based polymer and a derivative of an acrylonitrile-based polymer.

10. The method for producing a carbon material according to claim 8, wherein the vinyl-based polymer comprises at least one of an olefin-based polymer and a derivative of an olefin-based polymer.

11. The method for producing a carbon material according to claim 10, wherein the olefin-based polymer comprises at least one of polyethylene and polypropylene.

12. The method for producing a carbon material according to claim 1, wherein a volume concentration of the gaseous substance (A) is 2% by volume or more with respect to the total volume of a gas forming the non-oxidizing atmosphere.

13. The method for producing a carbon material according to claim 1, wherein the non-oxidizing atmosphere comprises a nitrogen gas.

14. The method for producing a carbon material according to claim 1, wherein the organic polymer material is fibrous.

15. The method of claim 1, wherein the first carbonization treatment is in a range of 0.5 to 180 minutes.

16. The method of claim 1, wherein the temperature in the first carbonization treatment is equal to or lower than 580° C.

17. The method of claim 1, wherein the second carbonization treatment is in a range of 0.5 to 30 minutes.

18. The method of claim 1, wherein the temperature in the second carbonization treatment is equal to or lower than 1,600° C.

* * * * *